Patented Apr. 17, 1934

1,955,075

UNITED STATES PATENT OFFICE 1,955,075

ADHESIVE FOIL

Georg Lienig, Billstedt, near Hamburg, Germany

No Drawing. Application January 29, 1931, Serial No. 512,214

2 Claims. (Cl. 87—17)

This invention relates to a method of producing and employing adhesive and glutinous substances, which are used in dry form without the addition of water.

Methods are already known, besides the usual gluing methods with liquid glues, for working with dry pulverous or laminated adhesive substances, when gluing is effected by heating and pressing, chiefly where surface gluing comes into question as in the manufacture of plywood and veneer. These so called dry gluing methods with powder are called but wrongly by this name, as in these methods not less water is used than in wet gluing.

When applying a gluing method with more water than is necessary for rendering soluble the glue, prejudicial influences act on the woods employed. This invention therefore utilizes a method which avoids these defects and disadvantages.

All raw materials, such as albumin bodies of animal or vegetable origin and, therefore the albumin derivates, adapted for preparing adhesive substances, are suitable for producing the dry glue. Moreover the amylaceous bodies of the plants, employed as agglutinant, can be used, such as blood albumin, blood, casein, fish albumin, carpenter's glue of all kinds, further vegetable albumin, vegetable casein, adhesives of various origin, such as various starch meals obtained from potatoes, wheat, maize and the like. All substances can be employed separately or mixed, fresh or in the usual commercial quality and used in any desired form for producing dry glue, no matter whether as powder or in foil-sheet-or band form and the like, the foil-band-and sheet form offering special advantages. These forms are made without carriers, i. e. without a base substance, for example paper, on which the mass is applied.

A quantity of hygroscopic substance dependent upon the kind is added to the dry glue before the drying. This substance must be chemically neutral to the adhesive substance, or example glycerin, the various hygroscopic kinds of sugar and hygroscopic salts, such as potassium carbonate etc. It has been found preferable, to render slightly soluble man, raw materials i. e. to slightly split up same hydrolitically, before working up to form the dry adhesive substance. This can be effected by acid alkaline or enzymatic method in known manner. Further for carrying out the method of producing the glue easily fusible salts of organic or inorganic nature, which are easily fusible as such, for example potassium carbonate, ammonium sulphate etc. or salts with high percentage of crystal water are added to the dry glue, besides the hygroscopic additions.

Before drying the dry glue, which is to be brought into sheet or band shape, an addition of rubber must preferably be added to the glue which addition can be effected in the form of emulsion. For this purpose various rubber emulsions can be used, of which the employment in the shape of rubber milk (latex) has been found most suitable. By this addition of rubber a particularly great durability and elasticity is imparted to the dry glue, so that the glue can be stored in rolled condition and does not lose its adhesive property by being stored a long time and further, owing to its great elasticity, adapts itself well to the bodies to be glued. A similar result can be obtained by the addition of resins, for example colophony in form of an oleaginous emulsion. It is possible to use the natural soluble condition of this resin in the form of viscous turpentine. By the addition of the resins an increase in the water resisting property of the dry glue is also obtained.

In the powderous form of the dry glue, its water resisting property is easily obtained by the addition of bodies which have a denaturizing effect on albumin only at high temperatures, for example alum, aluminium, products of condensation of the tannic acid of formaldehyde, etc.

The following examples may be mentioned for producing the dry glue:

1. Defibrinated blood is acidified at 40° C. with 0.5% of lactic acid (the percentages refer to the dry condition of the blood) and then 2.3% of ammonium sulphate is added in dissolved condition. The mixture is continually stirred at 35–40° C. and is neutralized with alkalies after 1 to 3 hours, until an alkaline reaction just occurs. 8 to 12% of concentrated glycerin and 5% of denaturizing substance are then added, intimately mixed and dried according to the form of the dry product on vacuum cylinders or gelatinizing machines.

2. For dry glue in pulverous form very finely pulverized blood albumin or casein is employed, calcium hydrate is added, and 2 to 3% of glycerin and 5% of denaturizing substance are added to the mixture. The further content of hygroscopic substances is not added directly to the powder, but is introduced into the mass by painting with the same the objects to be glued. Molasses or cellulose extract is very suitable for this purpose.

The method of using the dry glue is so carried out, that the dry glue in suitable form is introduced between the bodies to be glued. The whole is then heated to a temperature of 100 to 120° C. and pressed together. By the hygroscopic substances water is added to the dry glue in such a quantity, that sufficient moisture is present for rendering soluble the glue corresponding exactly to the temperatures employed, so that the detrimental influence effected by the excess water in other gluing methods is avoided and moistening of the bodies to be glued is not necessary. By the addition of easily fusible salts or of salts, which have a high percentage of crystal water, the melting temperature of the dry glue is kept in practice very low, so that even a heating up to 100° C. suffices.

As the adhesive power of the dry glue formed in bands or sheets is exactly as great as that of the best wet glue, it can be successfully employed in all wood industries which have to carry out surface gluing, such as plywood factories, carpenters' shops, door and table top factories and in carriage building shops for gluing on metal surfaces. An important factor is moreover the price of the dry glue, which does not exceed that of liquid glue per sq. mtr.

I claim:

1. A dry glue for gluing under pressure and heat without the addition of free water, comprising an adhesive substance, an easily fusible salt and hygroscopic substances which do not react with the adhesive substances, one of said gyroscopic substances containing water of crystallization so that the addition of free water is unnecessary.

2. A dry glue for gluing under pressure and heat without the addition of free water, comprising defibrinated blood acidified at 40° C. with 5% lactic acid, mixed with 2.3% ammonium sulphate, 8 to 12% concentrated glycerin and 5% denaturizing substance.

GEORG LIENIG.